Aug. 4, 1970

H. BELL ETAL 3,522,412

GAS TUNGSTEN ARC WELDING METHOD

Filed Dec. 18, 1967

INVENTORS
HARVEY BELL
STUART R. FERGUSON
LESLIE L. LITTLEFIELD
GERALD R. STOECKINGER

By Robert O. Richardson

ATTORNEY

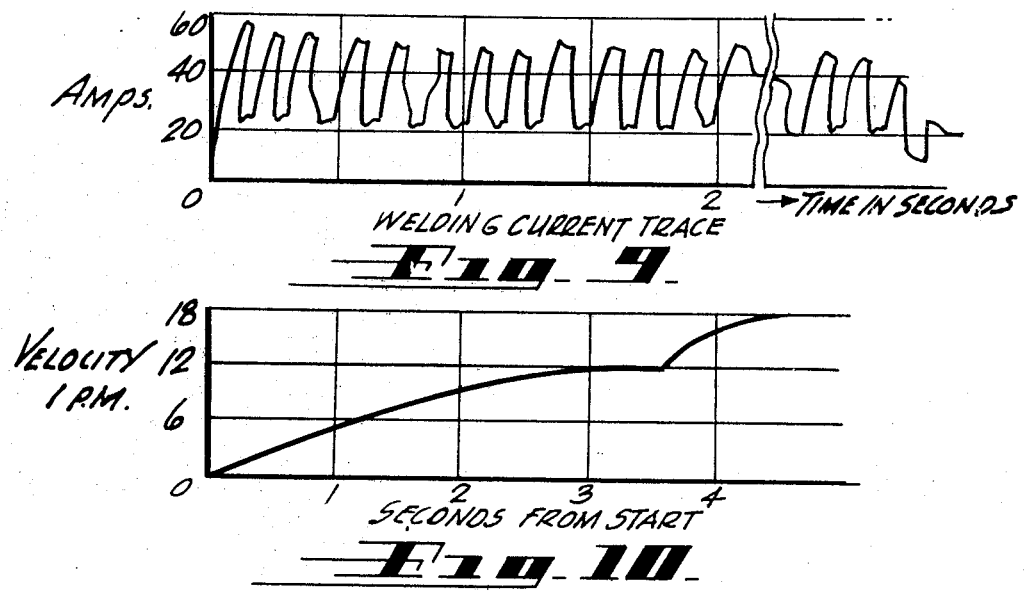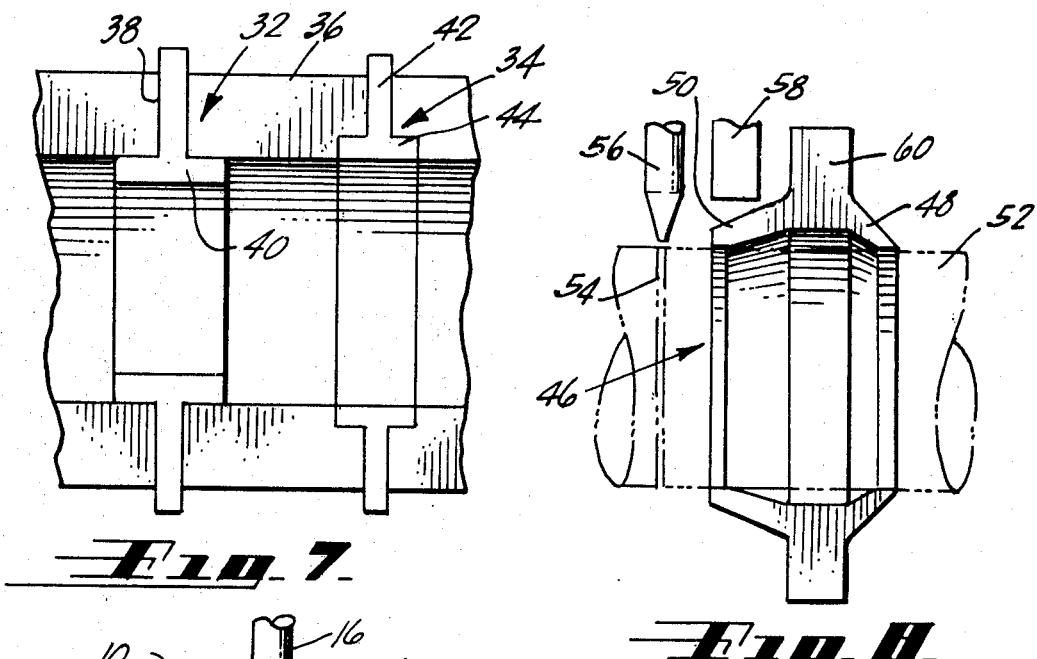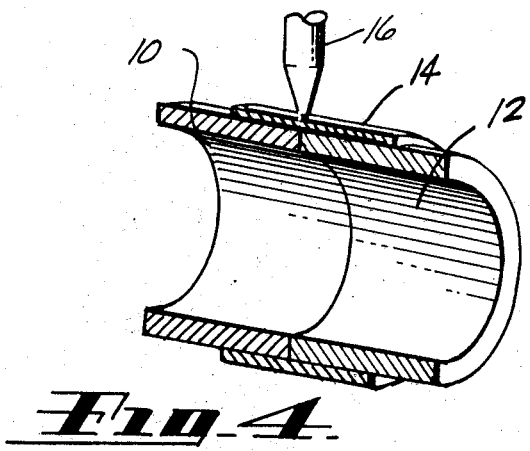

United States Patent Office 3,522,412
Patented Aug. 4, 1970

3,522,412
GAS TUNGSTEN ARC WELDING METHOD
Harvey Bell, Santa Monica, Stuart R. Ferguson, Beverly Hills, Leslie L. Littlefield, Bellflower, and Gerald R. Stoeckinger, Los Angeles, Calif., assignors to McDonnell Douglas Corporation, a corporation of Maryland
Filed Dec. 18, 1967, Ser. No. 691,382
Int. Cl. B23k 9/12
U.S. Cl. 219—137
3 Claims

ABSTRACT OF THE DISCLOSURE

A welding method wherein a slow rate pulsation of a decreasing amplitude amperage with an increased rate of electrode travel speed reduces the heat input to the part to be welded. Special inserts and chill clamps are further used to avoid drop-through in the welding of small diameter tubes of a relatively soft metal material.

BACKGROUND OF THE INVENTION

Sections of tubing may be joined together in a variety of ways. The tubes may be flared and separable connectors used to join the tubing. This method is simple but the connections are heavy and subject to leakage, especially when in a shock or vibration environment. Brazing, bonding and fusion welding methods provide a lighter and more reliable system of tubing for transporting liquids and gases in aircraft, missiles and space vehicles. As such, these methods are preferred.

In one form of welding of small diameter metallic tubing, a tungsten electrode is rotated about the stationary joint to make the weld. As the electrode progresses around the tube, the heat from the arc builds up and an irregular root bead formation of the weld occurs. In some cases this is so excessive that drop-through, with a resulting obstruction to the internal flow in the tube, may occur. The heat buildup also causes a widening in the heat affected zone which results in a lower mechanical property of the weld joint. Moreover, the weld puddle which is held in a stable position by the surface tension of the molten metal is adversely effected by its relative position in respect to gravitational forces and the position of the tungsten arc causing an irregular weld bead when positioned other than with the axis of the tube in a vertical position.

SUMMARY OF THE PRESENT INVENTION

In accordance with the present invention, the gas tungsten arc welding of small diameter metallic tubing is accomplished with a slow pulsating current (up to 10 cycles per second depending upon the kind of metal to be welded). This current is reduced in amplitude as the travel speed of the arc over the workpiece is increased, in the case of high thermal conductivity metals, and is held at a constant speed in other metals. The use of numerical or other programmed control systems assures that travel speeds, amperage amplitudes and pulse rate automatically follow a predetermined pattern in order to maintain the required heat input, all of which results in a more narrow heat affected zone, and a consistent root bead penetration in all positions of the arc. In the case of metals which readily fuse together metallurgically and have an oxide surface that readily flows out of the molten puddle, any number of joint configurations are possible.

Where reinforcement of the weld zone is required, a typical solution is to place a sleeve over the abutting tube ends to be joined and a weld bead is fused through the sleeve and both tube ends. Stainless steel is a material that is an example of this type.

When parent metal fusion displays a cracking tendency upon solidification, an insert of a buffer alloy is used between the ends of the tubes. Aluminum is a metal of this type. The insert is also used when filler material is required to provide a properly proportioned nugget geometry.

It is therefore an object of the present invention to provide for an improved method of welding small diameter metallic tubing.

Another object is the provision of an inert gas tungsten arc welding method wherein the tungsten electrode rotates about the stationary joint to make the weld.

Another object is the provision of a gas tungsten arc welding method using a slow amperage pulsation period, regulating the current amperage and speed of travel, thereby to reduce the heat input, to provide for a more narrow heat affected zone, and to avoid metallic drop-through within the tubes to be welded, and still attain complete penetration.

Other objects will become more apparent as a description of the invention proceeds, with reference to the drawings.

BRIEF DESCRIPTION OF THE DRAWINGS

FIG. 4 is a sectional view showing the relationship of the overlying sleeve, welding electrode and abutting tubes to be joined;

FIG. 7 is a cross sectional view of a consumable insert used in indexing the tubes, providing proper nugget geometry, and retarding cracking where necessary by providing proper metallurgical alloying with the parent tube material;

FIG. 8 is a cross sectional view of a clamp and chill bar used in controlling the amount of heat dissipation from the weld zone;

FIG. 9 is a graph showing the current amplitude and pulse rate in welding a tube in a third example, using ¼″ dia. aluminum tubing as the material; and FIG. 10 is a graph showing the welding torch travel speed in welding tubing with the welding amperage set forth in FIG. 9.

DESCRIPTION OF ILLUSTRATIVE EMBODIMENTS

Figure 1:
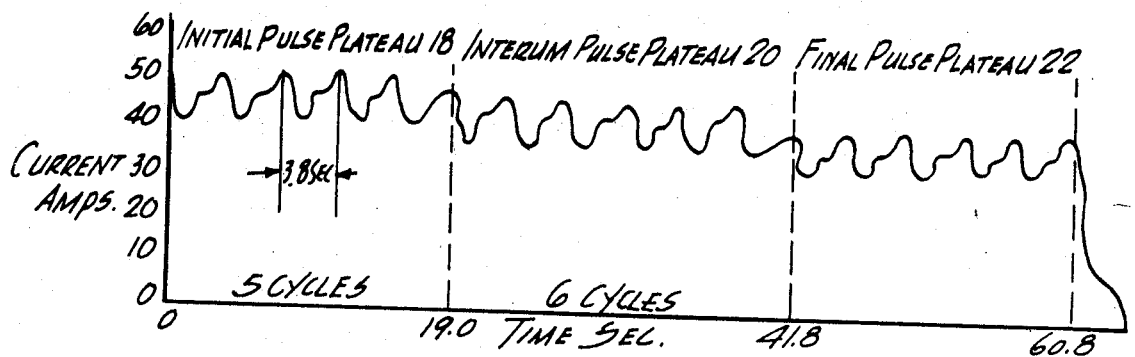
FIG. 1 is a graph showing the welding amperage amplitude and pulse rate in one example using a stainless steel type of material.

Transportation of fluids within vehicles requires a tubing and connector system that will not leak when subjected to the pressures, temperatures, eroding chemicals, and other environmental conditions to which they may be subjected. This requires thoughtful selection of materials and the manner which they may be joined. Stainless steel tubing, known as 1/8 H–304L, is one industry standard for use in high pressure hydraulic systems and Inconel 718 nickel base alloy has outstanding properties in the temperature range from −423 to 1600 degrees Fahrenheit for use in both cryogenic and hot gas systems. In one application where a 3000 p.s.i. hydraulic system was required, the tubing selected was ¾ inch O.D. with a .049 wall of stainless steel. The tubes, shown in FIG. 4, as 10 and 12, are joined with a butt joint by welding the tube ends through a reinforcing sleeve 14. Electrode 16 follows a path around sleeve 14 over the line of abutment of the tube ends.

To produce a good weld, initial current must be high to produce sufficient heat to fully penetrate the tube wall. Current (amperage) requirements for full penetration of heat for the sleeve 14 and tubes 10, 12 produces more heat than is desirable for the remaining weld, since heat build-up is a function of time and the thermal conductivity of the metal. Consequently, fall-through of the molten metal can occur due to gravitational effect upon the enlarged molten puddle produced by the excessive heat build-up and reduction in surface tension of the metal. In other words, the inner diameter of the tubing where the weld appears is smaller than the inside diameter of the tube throughout. A reduction in the addition of heat as the weld progresses is necessary because of heat build-up in the confines of the weld zone. Without a drop in current input, the weld would be irregular and excessive drop-through would occur. In the final stage the weld must be tapered out or cratering occurs, causing subsequent structural discontinuity and possible leakage.

In accordance with the present invention, the pulse cycle is reduced to low frequencies on the order of one cycle in four seconds and using a wide change in the current amplitude level with each cycle. This reduced the heat level so that satisfactory penetration of the tube with heat may be done, yet the width of the heat affected zone may be reduced and the undesirable fall-through eliminated. By suddenly raising the current and then lowering it, a larger portion of heat is usefully applied in melting the material because the heat transfer rates are a function of time plus the amount of heat input. In addition, the down slope of the pulse is important for it determines the melt puddle stability and surface tension. When the puddle reaches the size necessary to achieve the desired penetration, the heat must be reduced rapidly so that solidification begins and lends support to the remaining molten portion of the puddle before it can flow and create drop-through and excessive dimensional shrinkage in the tube.

An increase in welding speed, as well as reduction in current, gives a constant melting rate as the electrode travels around the tube. However, travel speed and pulse spacing must be correlated. In determining pulse spacing, two opposing factors must be balanced. The closer the spacing, the higher the heat input. This results in a wider fusion or welding zone, and a wider heat affected zone. The wider these zones, the less effective will be the sleeve as a reinforcement of the joint. The wider the spacing, the wider the spacing of the pulses with the attending probability that a void may occur which may cause leakage. The welding spots, or puddles, must overlap to assure a leak-proof joint. Therefore, a proper relationship between pulse cycle frequency, welding travel speed, and welding heat must be established.

The wave form in FIG. 1 graphically illustrates the initial pulse plateau 18, interim pulse plateau 20 and final pulse plateau 22 in making a weld of one full revolution about a tube of stainless steel. With a pulse time on the order of 3.8 seconds and with approximately 16 pulses per revolution, the weld can be made in approximately one minute. Upon completion of the weld there is an overlap of approximately two pulses before a gradual taper of the welding current is programmed to extinguish the arc without leaving a crater depression or crack in the weld puddle. The initial plateau 18 yields an average delivered current of 45 amps for five pulse cycles. As heat in the joint increases, the interim plateau 20 is reduced to yield an average current of 41 amps for six pulse cycles. As the weld nears one complete revolution, the heat is reduced once again, as shown at plateau 22, to yield an average current of 37 amps for the last five pulses, carrying it through the weld overlap and arc extinction period. This method of welding produces a tube joint that passes such tests as helium leak, ball test, X-ray, dye penetrant, tinsile and burst.

Figure 2:
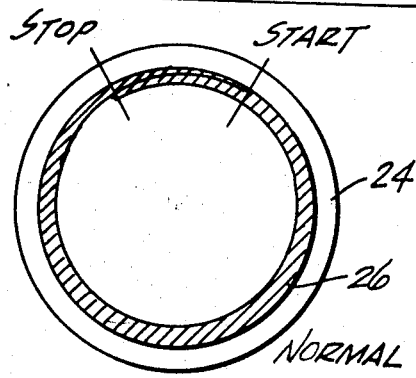
FIG. 2 is a cross sectional view of a tube welded in a conventional manner.
Figure 3:
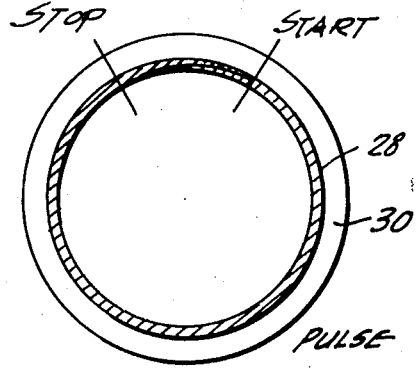
FIG. 3 is a cross sectional view of a tube welded in accordance with the present invention.

Reference is now made to the sectional views through a weld as shown in FIGS. 2 and 3. In FIG. 2 there is shown a tube 24 with a conventional weld 26 formed when a steady state D.C. current was applied throughout the complete weld cycle, past the arc start position to the stop position for an overlap of approximately 60°. As can be seen the thickness of the weld puddle and resolidification is not uniform about the tube whereas, with the pulsed current technique of the present invention as shown in FIG. 3, a uniform thickness is achieved throughout. This in-place gas tungesten arc burn-through sleeve butt weld 28 on tube 30 with consistent root bead penetration in all positions of the arc is achieved through numerically controlled pulsation of the welding current at a low rate, on the order of 3.8 seconds per pulse cycle, and having a pulsated welding current cycle having three levels each of peak and base current with variations between them, an example of which is set forth on the graph in FIG. 1.

The foregoing welding technique also may be applied to soft and high thermal conductivity metals such as aluminum or copper of a small diameter on the order of ¼ or ⅜ inch diameter except that faster travel speeds and pulsing at a higher frequency is required. In such cases where the thickness of the wall compared to the inside diameter has a high ratio, the fall-through problem is greater in the welding process, and is more detrimental since any restriction in a smaller diameter tubing is more serious. An insert between abutting tube ends is used for the purpose hereinafter set forth.

Figure 5:
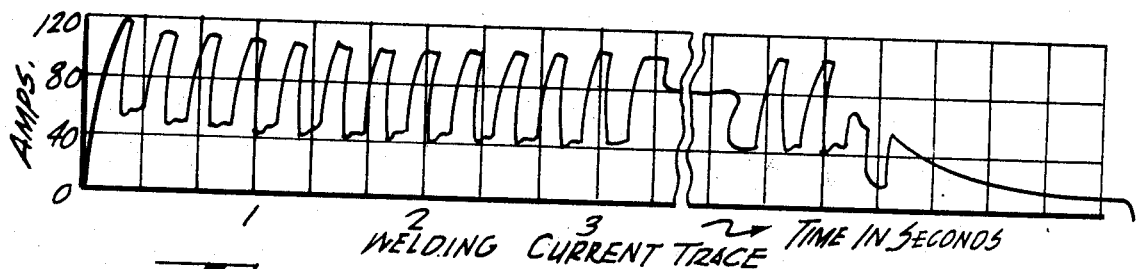
FIG. 5 is a graph showing the current amplitude and pulse rate in welding a tube in another example, using 1″ dia. aluminum as the material.
Figure 6:
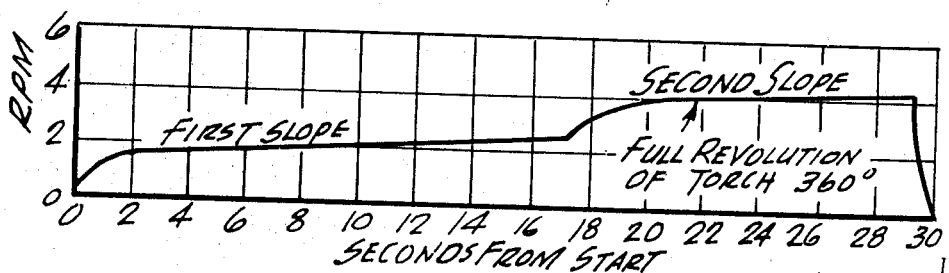
FIG. 6 is a graph showing the welding torch travel speed in welding the tubing with the welding amperage set forth in FIG. 5.

FIGS. 5 and 6 are graphic illustrations of welding arc current, and torch speeds in such case. The current pulsation trace in FIG. 5 illustrates the optimum for welding on a 1″ diameter 6061–T6 aluminum tubing having a .083 inch wall thickness. The in-place gas tungsten arc welding of 6061–T6 aluminum alloy tubing with a ratio of diameter to wall thickness of twelve or less has not heretofore been successfully performed to applicants' knowledge. In this technique wherein the tungsten electrode automatically rotates about the stationary joint, the key difficulty in achieving consistent full penetration, single pass welds resides in the welding heat delivery and dissipation. Since aluminum alloy has a high thermal conductivity, the heat delivered in the arc must be great enough to achieve penetration on initiation of the weld. Once this is achieved, the remaining weldment is difficult to perform because the heat concentration and build up during the remainder of the cycle is of such magnitude that the weld becomes generally concave, with excessive penetration into the tube. In such cases, drop-through weld metal may partially close the inner diameter of the tube and thus obstruct flow. Likewise, at the termination of the weld there is generally a large concave weld crater of newly solidified metal which contains many cracks, due to shrinkage stresses acting during solidification. This condition is particularly critical in alloys such as 6061–T6 aluminum, because an insufficient amount of liquid films exist in the grain boundaries in the temperature range between the solidus and liquidus range during solidification which can result in crater and centerline cracks in the weld as shrinkage stresses develop. Therefore, any attempts at welding this alloy must involve the use of a buffer alloy such as 4043 aluminum. This contains silicon which when alloyed in the weld metal permits the necessary grain boundary slip. Another problem in welding this alloy in tube form is that when the penetration is achieved, the wetability on the root side, i.e., the inside, is usually poor due to the fact that proper removal of aluminum oxide on the inside diameter of the tube is difficult. This oxide condition prevents wettability and good formation of the root side weld bead. Finally, the excessive heat required to make a weldment on tubing such as this has an additional drawback in that it tends to anneal a wide area of that material adjacent to the weld bead itself. This area is known as the heat affected zone and the broader it is, the less the mechanical properties of the resultant weld joint. These problems are particularly troublesome in tubing configurations having a diameter to wall thickness ratio of 12 or less.

By pulsating at a rate on the order of four cycles per second, the weld puddle is cooled by varying the weld current from a peak of 105 amps to a base current of 40 amps, the withdrawal or reduction of welding current at this pulsation rate permits a temporary cooling of the weld puddle which serves to quench the weld and permit successful and consistent bead contour and uniform minimum drop-through throughout the complete weld cycle. However, pulsation alone will not achieve the end result. It must be accompanied by a programmed in-process travel speed increase. The weld travel speed is programmed for a duration of 13 seconds for the first half of the revolution and 8.5 seconds for the second half of revolution about the tube, consuming a total of 21.5 seconds for one revolution for a one inch O.D. tube. To eliminate the prevalent tendency for a depressed weld crater and perhaps crater cracking, the welding travel speed is increased just prior to the point of one revolution to this higher rate. This upsurge of travel speed, as shown in FIG. 6, permits a so-called runoff of the weldment and therefore permits a reduced concavity in the crater. In addition to the regulation of travel speed and pulsation of the weld current, it is also necessary to use an aluminum welding flux or other substance which, when applied to the inside of the joint once assembled, and achieves the wettability and breakdown and flow of the aluminum oxides necessary to obtain a uniform root bead. A flux commercially available as Solar 202 is satisfactory for this purpose.

As shown in FIG. 7, there are two inserts 32 and 34, made from 4043 aluminum alloy which may be used in the welding of tubing having a parent material 36 of 6061–T6 aluminum. Insert 32 consists of a web 38 extending outwardly beyond the outer circumference of the metal tube 36, and inner head 40 which abuts against the inner wall of the tube 36. This configuration is perhaps less expensive than insert 34 and may be used in the larger size tubing where the head 40 does not severly restrict the fluid flow. Insert 34 also consists of a web 42 extending outwardly beyond the outer surface of the tube 36 but the inner head 44 is recessed into the wall of the tube so that the inner diameter of the head is the same as the inner diameter of the tube 36. This requires machining but does not restrict fluid flow when smaller diameter tubing is used.

By the use of the insert 32 or 34 of an alloy dissimilar to that of tube 36, the natural cracking tendency of the parent material is completely eliminated with this buffer alloy. The insert must be designed specifically to provide the right amount of filler addition to eliminate the concavity of the weld as well as providing enough drop-through material to have good root bead formation. It is essential that this insert be contained entirely within the joint so that proper alloy dilution is achieved. Likewise, the protrusion or elevation of this insert above the joint is essential and must be dimensionally controlled so that the tungsten electrode to workpiece distance may be accurately established while yielding a flat to slightly convex face weld bead.

To combat the abnormal or excessive amount of heat developed in joining aluminum tubing by this technique, another innovation for chilling the weld was utilized. In FIG. 8 is shown a beryllium copper chill clamp 46, a set of which is used on both sides of the joint. It should be noted that leg 48 is shorter than leg 50 to permit the clamp to protrude into the direction of the joint, which is to the left of the view shown. It is intended that leg 50 be spaced to contact tube 52, shown in phantom lines, approximately .250 inch away from the joint 54 which is under weld tip 56. Leg 50 must extend between the pipe 52 and a portion of the gas cup 58 within which tip 56 is rotated. This proximity to the weld joint permits high conduction of heat from the tube into the annular section 60 which serves as a heat sink, taking advantage of the high thermal conductivity of this alloy. Likewise, beryllium copper provides the necessary hardness and spring back in the clamps so that they are not permanently deformed from the heat of welding and thus maintain the resiliency necessary for repeated joining.

The above mentioned features when combined will provide an optimum single pass butt weld made in the one inch diameter by .083 inch weld thickness 6061–T6 aluminum tubing. Optimum conditions result from the following parameters: The pulse rate is four cycles per second, the peak current is 105 amps, the base current is 40 amps and the voltage is 15 volts in helium shielding gas. The average welding speed is 8.76 inches per minute which is achieved by gradually increasing the travel speed as the weld progresses around the joint. The initial current is 125 amps and the final current is 20 amps. A two percent thoriated tungsten electrode of 0.063 diameter with a sharp point is used.

As can be seen in FIGS. 9 and 10, when compared to the graphs in FIGS. 5 and 6, the current amplitude, pulse rate and torch travel speed for a ¼" O.D. aluminum tube differs from that of a 1" tube. The pulse rate has been increased from 4 cycles per second to 6 cycles and the amperage has been reduced to about half. As shown in FIG. 9 the amperage range is between 45 and 22 amperes. Although FIG. 10 shows torch speed in inches per minute, for a ¼" tube it can be calculated that it takes a little over 4 seconds to make one revolution. This compares with the slower speed and farther distance of travel over the 1" tube which takes about 22 seconds to travel one revolution. The rate of torch travel increases throughout and steps up sharply as the torch approaches a full revolution and the starting point which had been heated previously.

Having thus described the preferred embodiments of the present invention, it is to be understood that various modifications and deviations will become apparent to those skilled in the art and it is to be understood that these modifications from the foregoing description are to be considered as part of the invention as set forth in the appended claims.

We claim:

1. A gas tungsten arc welding method of heat control in butt welding tubing of relatively high heat conductivity having a diameter no greater than 1" O.D. and having a diameter to wall thickness of no greater than 12 wherein a heat build-up may occur ahead of the welding arc in the weld path around the tubing, and wherein the welding arc travels around the tubing, said method comprising the steps of:
   applying a peak amplitude current to the welding electrode sufficient to cause welding heat penetration through the tubing walls,
   pulsing said current at a predetermined frequency up to 10 cycles per second,
   decreasing the current amplitude and increasing travel speed of the arc to reduce heat input to compensate for heat build-up and thus maintain a predetermined heat at the weld area.

2. The welding method as set forth in claim 1 wherein ¼" O.D. aluminum tubing is used, the pulse rate is approximately 6 cycles per second, the amperage range is between 45 and 22 amperes, the welding travel speed is approximately 4 seconds per revolution and wherein the increasing travel speed increases at a higher rate just prior to the point of one revolution of said arc about said tubing.

3. The welding method as set forth in claim 1 wherein 1″ O.D. aluminum tubing is used, the pulse rate is on the order of four cycles per second, the welding current has a peak of 105 amperes and a base current of approximately 40 amperes, the weld travel speed is approximately 13 seconds for the first half revolution and approximately 8.5 seconds for the last half cycle.

References Cited

UNITED STATES PATENTS

| 3,148,266 | 9/1964 | Bichsel et al. | 219—137 |
| 3,180,965 | 4/1965 | Kitrell | 219—137 X |
| 3,291,961 | 12/1966 | Benschop et al. | 219—135 X |
| 3,390,250 | 6/1968 | Apblett et al. | 219—137 X |

JOSEPH V. TRUHE, Primary Examiner

J. G. SMITH, Assistant Examiner